US012633815B2

(12) United States Patent (10) Patent No.: US 12,633,815 B2
Yu (45) Date of Patent: May 19, 2026

(54) PARALLELING POWER SEMICONDUCTORS WITH DIFFERENT SWITCHING FREQUENCIES

(71) Applicant: North Carolina State University, Raleigh, NC (US)

(72) Inventor: Wensong Yu, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 18/803,024

(22) Filed: Aug. 13, 2024

(65) Prior Publication Data

US 2025/0070637 A1 Feb. 27, 2025

Related U.S. Application Data

(60) Provisional application No. 63/533,757, filed on Aug. 21, 2023.

(51) Int. Cl.
H02M 7/537 (2006.01)
H02M 1/00 (2006.01)

(52) U.S. Cl.
CPC ......... H02M 1/0054 (2021.05); H02M 7/537 (2013.01)

(58) Field of Classification Search
CPC .................................................. H02M 1/0054
See application file for complete search history.

(56) References Cited

U.S. PATENT DOCUMENTS

| | | | |
|---|---|---|---|
| 7,034,345 B2 | 4/2006 | Chang et al. | |
| 8,830,711 B2 * | 9/2014 | Lai ....................... | H03K 17/168 |
| | | | 363/132 |

| | | | |
|---|---|---|---|
| 9,722,581 B2 * | 8/2017 | Zhao .................... | H03K 17/122 |
| 9,735,771 B1 * | 8/2017 | Lu ........................ | H03K 17/602 |
| 9,912,279 B2 * | 3/2018 | Chai ................... | H02M 7/5387 |
| 10,116,213 B2 * | 10/2018 | Shimizu .................. | H10D 8/00 |
| 10,256,640 B2 * | 4/2019 | Kato ........................ | H02J 5/00 |
| 10,404,188 B2 * | 9/2019 | Saha ................ | H02M 7/53875 |
| 10,475,909 B2 * | 11/2019 | Basler .............. | H03K 17/08122 |
| 10,886,909 B2 * | 1/2021 | Baburske ............. | H10D 84/035 |

(Continued)

FOREIGN PATENT DOCUMENTS

EP 4064564 A1 9/2022

OTHER PUBLICATIONS

International Search Report for PCT/US2024/042072 mailed Sep. 24, 2024.

*Primary Examiner* — Gary L Laxton
(74) *Attorney, Agent, or Firm* — Thomas | Horstemeyer, LLP

(57) ABSTRACT

Various examples are provided related to operation of parallel semiconductors with different switching frequencies. In one example, a method of reducing conduction and switching losses in a high current switching circuit includes controlling two hybrid switches to conduct concurrently or alternately, each of the hybrid switches include a wide bandgap device and a silicon power device. Controlling of the silicon power device is at a first gate switching frequency and controlling of the wide bandgap device is at a second gate switching frequency, where the first gate switching frequency is lower than the second gate switching frequency. The silicon power device can be switched at a frequency of about 50 or 60 Hertz. The wide bandgap device can be switched at a frequency greater than 1 kHz.

19 Claims, 6 Drawing Sheets

(56) References Cited

U.S. PATENT DOCUMENTS

| | | | | |
|---|---|---|---|---|
| 11,043,943 B2* | 6/2021 | Vemulapati | .......... | H03K 17/567 |
| 11,057,033 B2* | 7/2021 | Van Brunt | ........... | H03K 17/567 |
| 11,677,307 B2* | 6/2023 | Khananashvili | .. | H02M 3/33515 |
| | | | | 363/123 |
| 11,973,011 B2* | 4/2024 | Sato | ........................ | H01L 24/40 |
| 12,341,516 B2* | 6/2025 | Alisar | .................... | H03K 3/011 |
| 2012/0057387 A1* | 3/2012 | Lai | ....................... | H03K 17/567 |
| | | | | 327/434 |
| 2012/0201066 A1* | 8/2012 | Dubois | ................ | H02J 15/007 |
| | | | | 363/127 |
| 2012/0274388 A1* | 11/2012 | Badger | ............... | H01H 1/0094 |
| | | | | 327/478 |
| 2014/0184303 A1* | 7/2014 | Hasegawa | ......... | H01L 23/49562 |
| | | | | 327/377 |
| 2014/0185346 A1* | 7/2014 | Liu | ..................... | H01L 29/1608 |
| | | | | 257/77 |
| 2015/0115289 A1* | 4/2015 | Fursin | ................ | H01L 29/7395 |
| | | | | 257/77 |

| | | | | |
|---|---|---|---|---|
| 2016/0191021 A1* | 6/2016 | Zhao | .................... | H03K 17/567 |
| | | | | 327/109 |
| 2016/0191046 A1* | 6/2016 | Zhao | .................... | H03K 17/567 |
| | | | | 327/419 |
| 2017/0257022 A1* | 9/2017 | Bryant | .................. | H02M 1/088 |
| 2017/0345917 A1* | 11/2017 | Basler | ............. | H03K 17/08122 |
| 2017/0366180 A1* | 12/2017 | Baburske | ........... | H01L 29/1608 |
| 2018/0269799 A1* | 9/2018 | Kimura | ............... | H02M 7/5387 |
| 2018/0269872 A1* | 9/2018 | Basler | ................... | H10D 30/83 |
| 2018/0278178 A1* | 9/2018 | Saha | ................. | H02M 7/5387 |
| 2018/0287510 A1* | 10/2018 | Saha | ................ | H02M 7/53875 |
| 2019/0273493 A1* | 9/2019 | Vemulapati | .......... | H03K 17/567 |
| 2019/0386652 A1* | 12/2019 | Korner | ................ | H03K 17/122 |
| 2020/0295673 A1* | 9/2020 | Dai | .................... | H02M 7/53871 |
| 2020/0343809 A1* | 10/2020 | Beddingfield | ....... | H03K 17/164 |
| 2021/0313872 A1* | 10/2021 | Brown | ................ | H03K 17/567 |
| 2022/0037986 A1* | 2/2022 | Khananashvili | .... | H02M 1/0058 |
| 2022/0376605 A1* | 11/2022 | Rahimo | ............... | H02M 1/088 |
| 2023/0275576 A1* | 8/2023 | Baburske | ........... | H01L 29/0834 |
| | | | | 327/108 |
| 2024/0055993 A1* | 2/2024 | Wijekoon | ............ | H02M 7/487 |

* cited by examiner

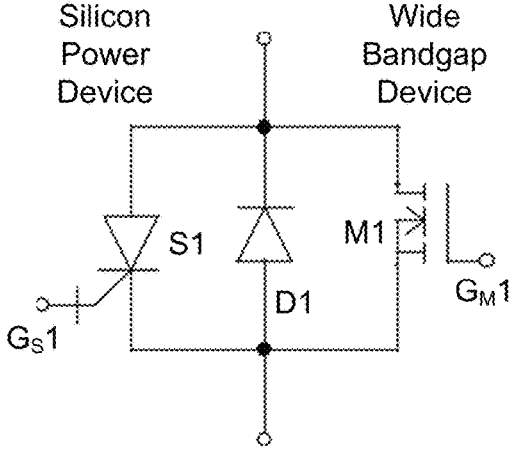
FIG. 1A
FIG. 1B
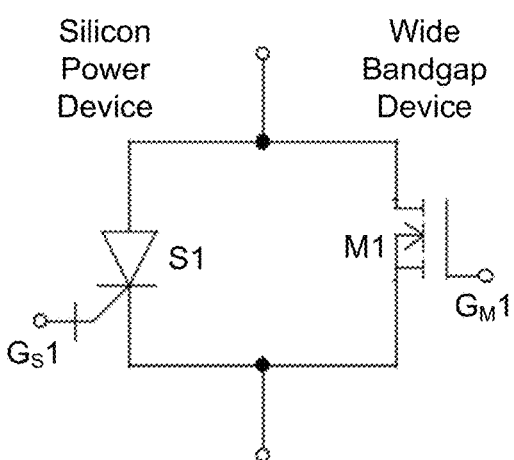
FIG. 1C
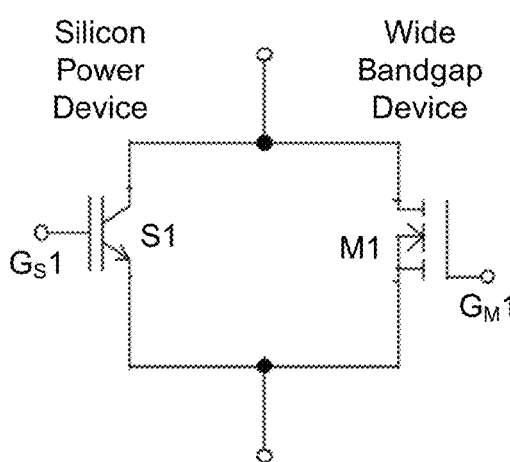
FIG. 1D

PARALLELING POWER SEMICONDUCTORS WITH DIFFERENT SWITCHING FREQUENCIES

CROSS REFERENCE TO RELATED APPLICATIONS

This application claims priority to, and the benefit of, U.S. provisional application entitled "Paralleling Power Semiconductors With Different Switching Frequencies" having Ser. No. 63/533,757, filed Aug. 21, 2023, which is hereby incorporated by reference in its entirety.

BACKGROUND

Switching regulators and power converters such as inverters are much preferred because of the increased efficiency they can potentially provide by rapidly connecting and disconnecting the power input as needed to maintain the output voltage at a desired level. Thus, the period when a voltage drop occurs across the regulator or power converter will be limited to relatively short periods of time and overall efficiency can be improved. However, such switching is cyclic and some portions of the switching cycle may be less efficient than others due to the instantaneous conduction conditions in the regulator or power converter circuit. The amount of current passing through the regulator or power converter can vary widely over a single switching cycle and between switching cycles, depending on input voltage or output current.

SUMMARY

Aspects of the present disclosure are related to operation of parallel semiconductors with different switching frequencies. In one aspect, among others, a method of reducing conduction and switching losses in a high current switching circuit comprises controlling two hybrid switches to conduct concurrently or alternately, wherein each of said hybrid switches comprise a wide bandgap device and a silicon power device, controlling of the silicon power device at a first gate switching frequency and controlling of the wide bandgap device at a second gate switching frequency, where the first gate switching frequency is lower than the second gate switching frequency. In one or more aspects, the silicon power device can be switched at a frequency of about 50 or 60 Hertz. The wide bandgap device can be switched at a frequency greater than 1 kHz. The wide bandgap device can be switched at a frequency of about 20 kHz. In various aspects, the two hybrid switches can form a half-bridge circuit. Two additional hybrid switches can be controlled to conduct alternately in a full bridge circuit. The two hybrid switches can form a phase leg of a multi-phase power converter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1D illustrate examples of hybrid switches, in accordance with various embodiments of the present disclosure.

DETAILED DESCRIPTION

Figure 2:
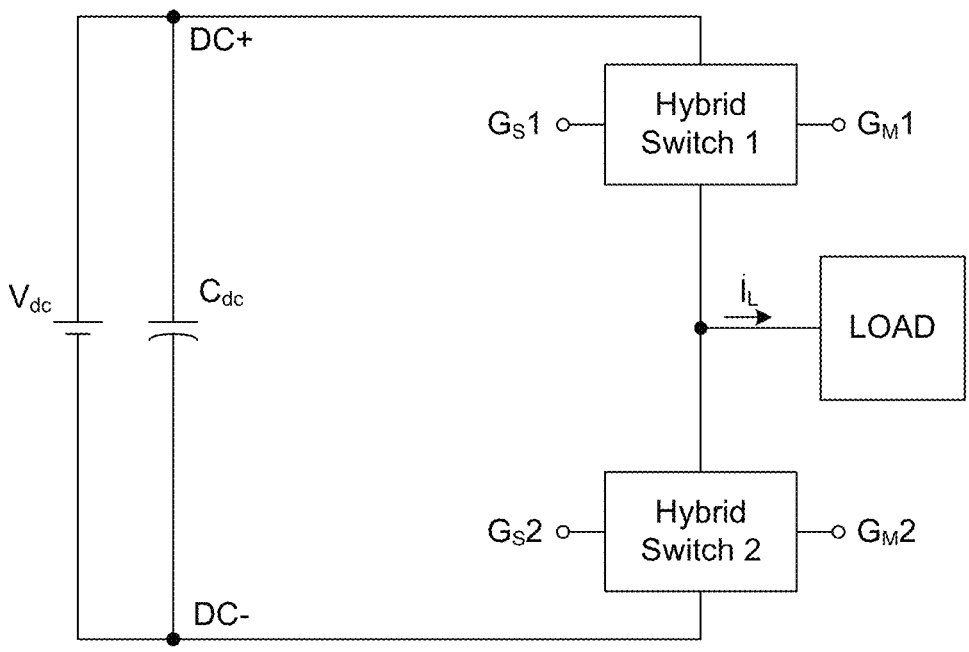
FIG. 2 illustrates an example of an inverter circuit employing the hybrid switches of FIGS. 1A-1D, in accordance with various embodiments of the present disclosure.

Disclosed herein are various examples related to operation of parallel semiconductors with different switching frequencies. Reference will now be made in detail to the description of the embodiments as illustrated in the drawings, wherein like reference numbers indicate like parts throughout the several views.

At light loads where conduction losses are reduced, the amount of power consumed by the rapid switching, referred to as switching losses, becomes a significant fraction of the total power consumption of the regulator or power converter. Switching losses can be substantially reduced by so-called hard switching or eliminated by so-called soft switching using wide bandgap semiconductor. Conversely, at heavy loads where high current is drawn through the regulator or power converter, conduction losses in the switches, generally wide bandgap MOSFETs since they are well-suited to operation in a hard-switching or soft-switching mode, tend to predominate because the conduction path in MOSFETs is substantially resistive. Conduction losses theoretically could be mitigated by placing a large number of MOSFETs in parallel to reduce currents in individual MOSFETs and thus reduce the voltage drop. However, such a parallel connection of many switches is not generally practical due to the cost of multiple switching devices. By operating a silicon power device connected in parallel with a wide bandgap device at a lower switching frequency than the wide bandgap device, the switching loss and conduction loss can be significantly reduced since the switching frequency of the silicon power device is effectively reduced.

Referring to FIGS. 1A-1D, shown are schematic diagrams illustrating examples of hybrid switch arrangements in accordance with various embodiments of the present disclosure. The hybrid switch arrangements include a silicon power device S1 connected in parallel with a wide bandgap device M1. The silicon power device S1 can be, e.g., a silicon controlled rectifier (SCR) as shown in FIGS. 1A and 1C or an insulated-gate bipolar transistor (IGBT) as shown in FIGS. 1B and 1D. The wide bandgap device M1 can be a metal oxide semiconductor field-effect transistor (MOSFET) device. For soft switching, the silicon power device S1 also has a diode D1 connected in parallel with the conduction terminals thereof as shown in FIGS. 1A and 1B. The wide bandgap device M1 also includes a similarly connected diode referred to as a body diode. Each transistor is controlled by a corresponding gate control signal $G_S1$ or $G_M1$ with the silicon power device S1 operated at a lower switching frequency than the wide bandgap device M1.

The silicon power device S1 operates at low switching frequency (for example, at an operational frequency of 60 Hz) and the wide bandgap device M1 operates at high switching frequency (for example, a frequency of 20 kHz). The silicon power device S1 is able to handle most currents at a low turn-on voltage with no severe switching losses. The wide bandgap device can operate at a high switching frequency (e.g., in a kilohertz frequency range) at low current. By paralleling the semiconductors with different switching frequencies, the overall conduction and switching losses can be reduced. At the same time, the system cost is reduced compared to systems only employing wide bandgap devices. The following table summarizes the advantages and benefits of the proposed configuration.

|  | Cost | Performance |
|---|---|---|
| Proposed hybrid switches with different switching frequencies (80% saving of Wide Bandgap Device) | Very Low | Very Good |
| Current State-of-the-Art (Wide Bandgap Device) | Expensive | Good |
| Classic State-of-the -Art (Low Speed Silicon Device) | Very Low | Not Good |

Referring now to FIG. 2, shown is an example of an inverter circuit employing the hybrid switch of FIG. 1A or 1B. It should be understood that examples of inverter circuits using the hybrid switches in other zero voltage switching inverters are considered to be within the scope of the present disclosure.

As illustrated in FIG. 2, the inverter circuit comprises two hybrid switches, which alternately connect the DC+ and DC− busses, which receive power from a power supply, battery or the like, generically illustrated as $V_{dc}$ and $C_{dc}$, to a load. (The current return path from the load is not shown.) The upper hybrid switch comprises a wide bandgap device M1, a silicon power device S1, and optionally a diode D1 as described with respect to FIGS. 1A-1D. In a conventional hard-switching inverter, only IGBTs S1 and S2 and diodes D1 and D2 are used. IGBT S1 conducts the positive current, while diode D1 conducts the negative freewheeling current. Similarly, IGBT S2 conducts the negative current, while D2 conducts the positive freewheeling current. With added MOSFETs M1 and M2, the positive currents are shared between M1 and S1 and the negative currents are shared between M2 and S2 while the positive and negative freewheeling currents are shared between the diodes D1, D2 and the body diodes of the MOSFETs M1 and M2, respectively. Two gate signals control each hybrid switch: GS1 and GM1 for the upper switch and GS2 and GM2 for the lower switch. Voltage and current phase sensors can provide feedback for gate control. The low switching frequency can be controlled based on the voltage feedback and the high switching frequency can be controlled based on the current feedback.

The inverter circuit of FIG. 2 is perhaps the simplest and most generalized inverter circuit possible and its operation can be readily understood by those skilled in the art. Similarly, from the above discussion in connection with FIGS. 1A-1D, it can be understood that the reduction of voltage drop across the hybrid switches (compared with the conventional circuit in which only the IGBTs S1 and S2 are used) can significantly improve efficiency when any significant current is drawn by the load and particularly at light loads which will occur near the times when the on-state is reversed between switches.

Figure 3:
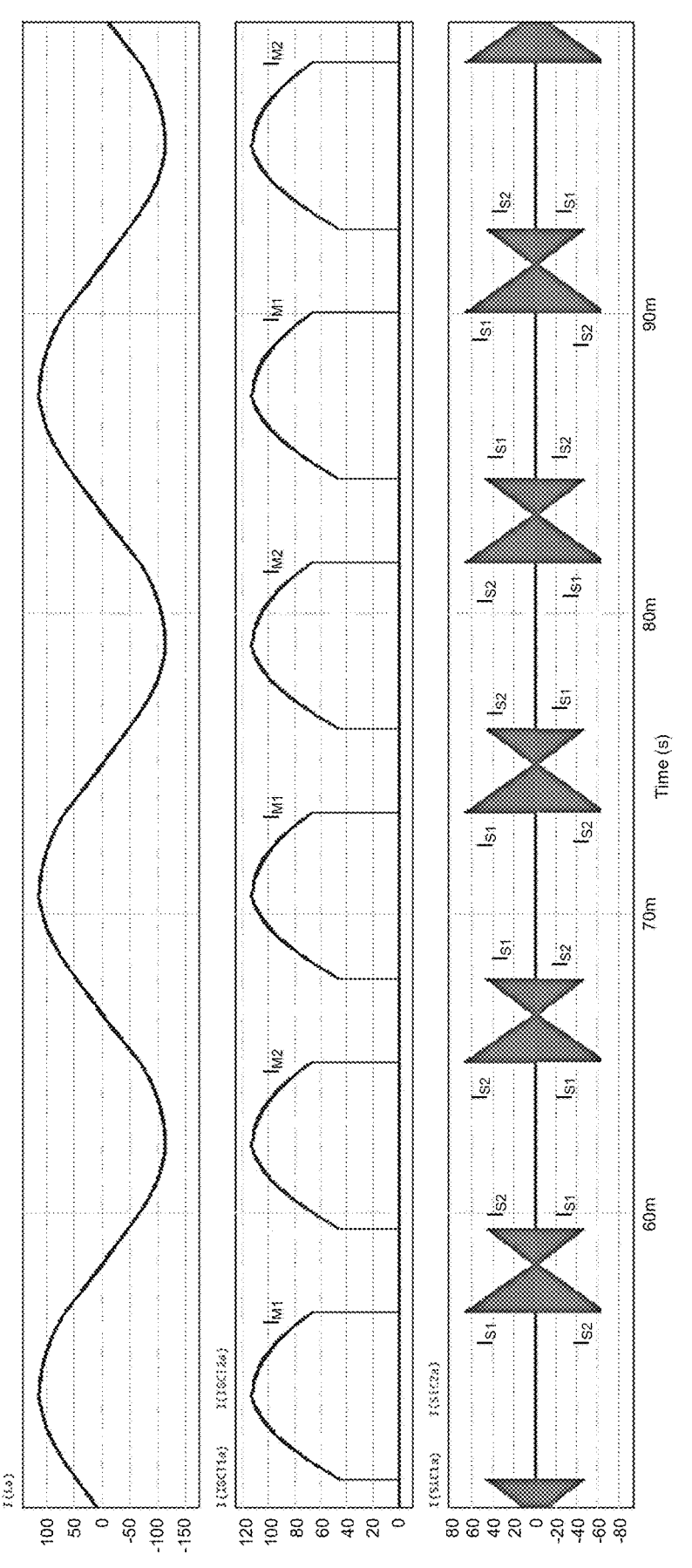
FIG. 3 illustrates examples of currents of the produced using the hybrid switches of FIGS. 1A-1D, in accordance with various embodiments of the present disclosure.

FIG. 3 shows an example of the load current (top) supplied by switching the silicon power devices S1 and S2 at a lower switching frequency than the wide bandgap devices M1 and M2. The currents of the wide bandgap devices M1 and M2 (center) and the currents of the silicon power devices S1 and S2 produced by the switching scheme are also illustrated. Under full load conditions the inverter efficiency is approximately the same or effectively increased by using ultra-low voltage drop silicon devices, the hybrid switching scheme can provide a significant conduction and switching loss reduction/efficiency gain under lesser load conditions.

Figure 4:
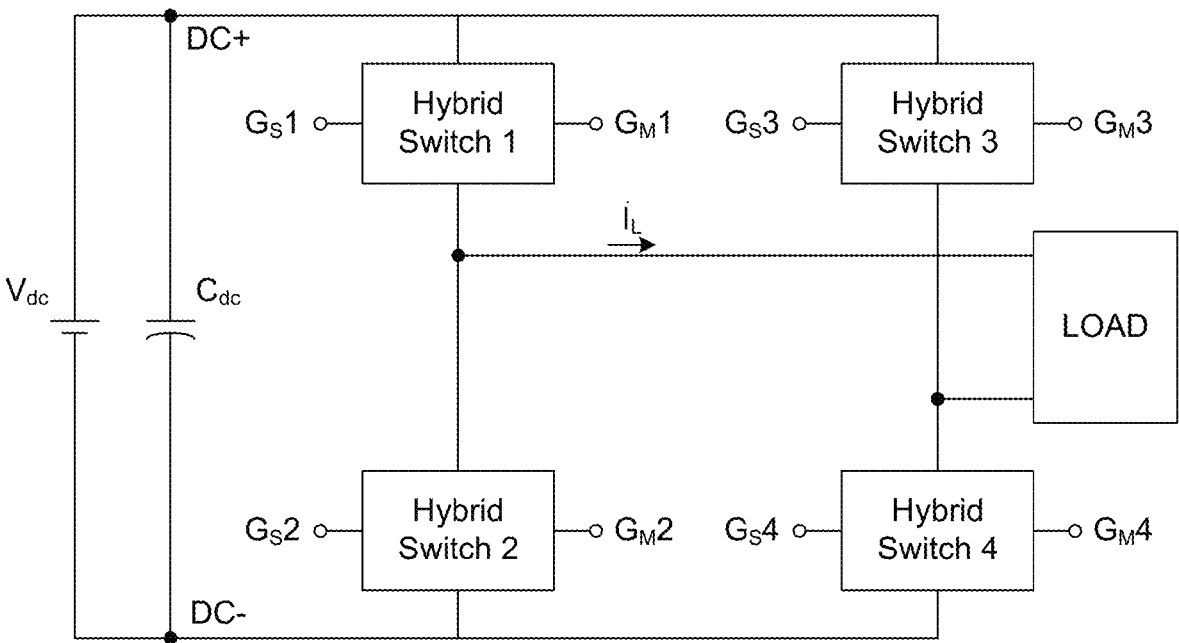
FIGS. 4 and 5A-5B illustrate examples of full-bridge inverter and three-phase inverter circuits employing the hybrid switches of FIGS. 1A-1D, in accordance with various embodiments of the present disclosure.

The hybrid switch is usable in virtually any soft-switching or hard-switching inverter, regulator or power converter. For example, FIG. 4 schematically shows a full-bridge resonant snubber inverter (RSI) circuit including hybrid switches in accordance with the disclosure. The full bridge operation is to have hybrid switches turning on and off simultaneously for the positive load current and hybrid switches turning on and off simultaneously for the negative load current. To achieve soft switching for hybrid switches, the resonant current relies on the turning on of auxiliary switch Sr1 which creates a positive current to discharge capacitors so that the hybrid switches can be turned on under zero voltage conditions. Similarly, for the negative current cycles, the negative resonant current relies on the turning on of auxiliary switch Sr2 to discharge capacitors to achieve soft switching for the hybrid switches. Voltage and current phase sensors can provide feedback for gate control. The low switching frequency can be controlled based on the voltage feedback and the high switching frequency can be controlled based on the current feedback.

Figure 5A:
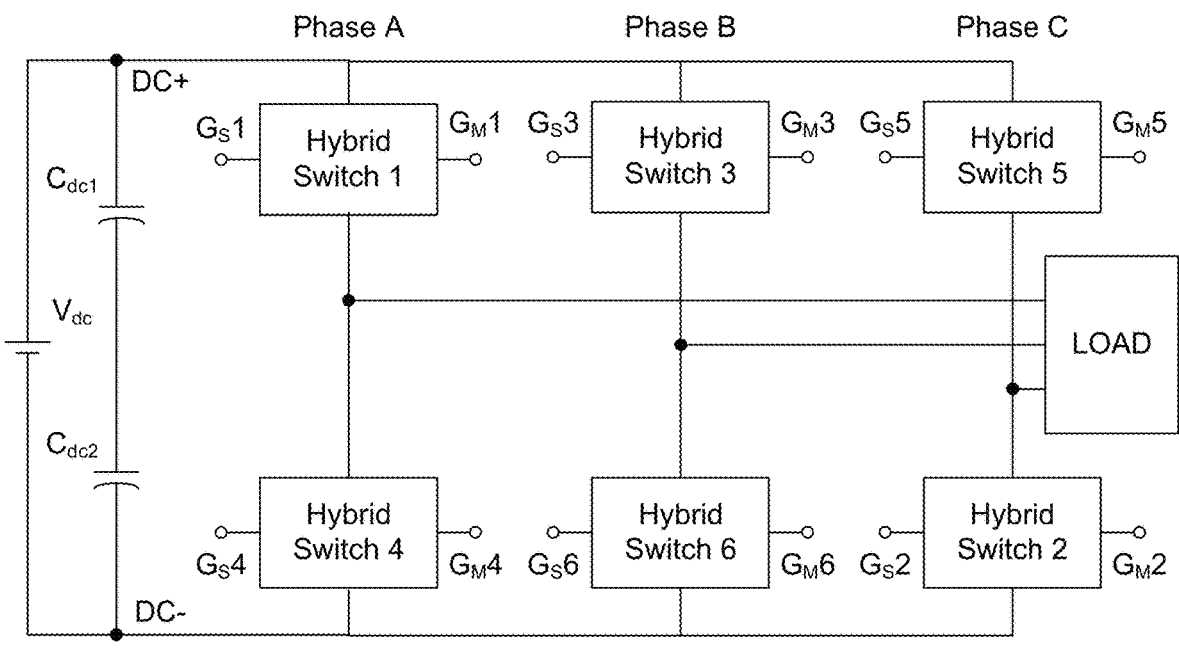
Figure 5B:
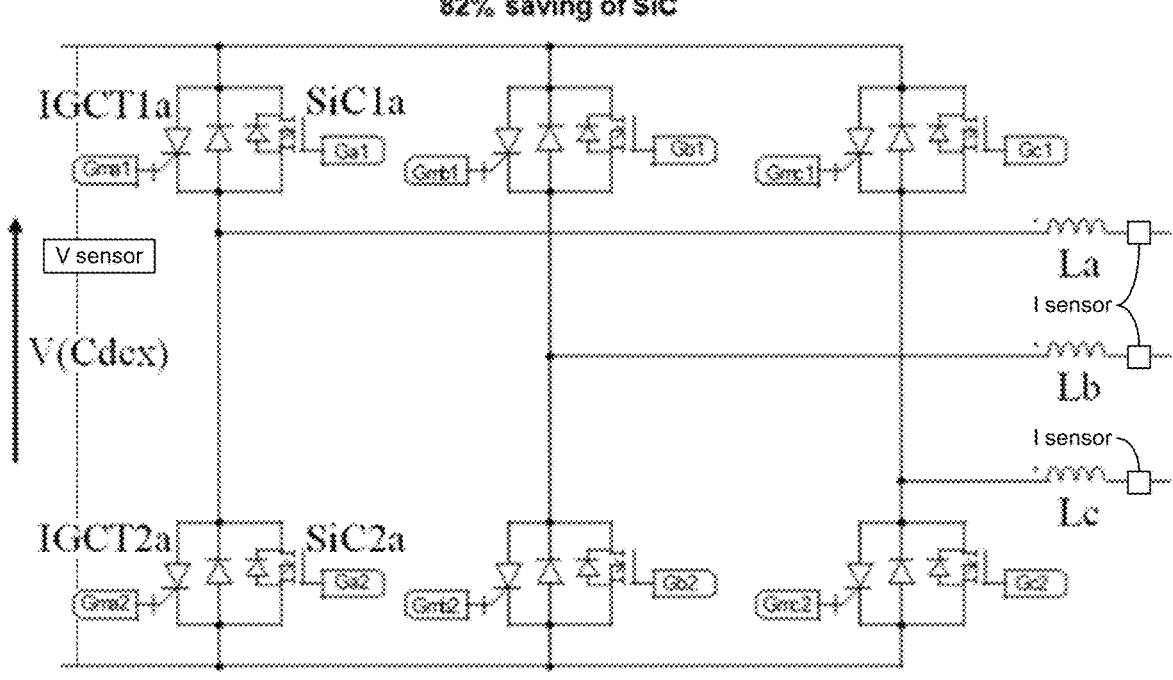
Figure 6:
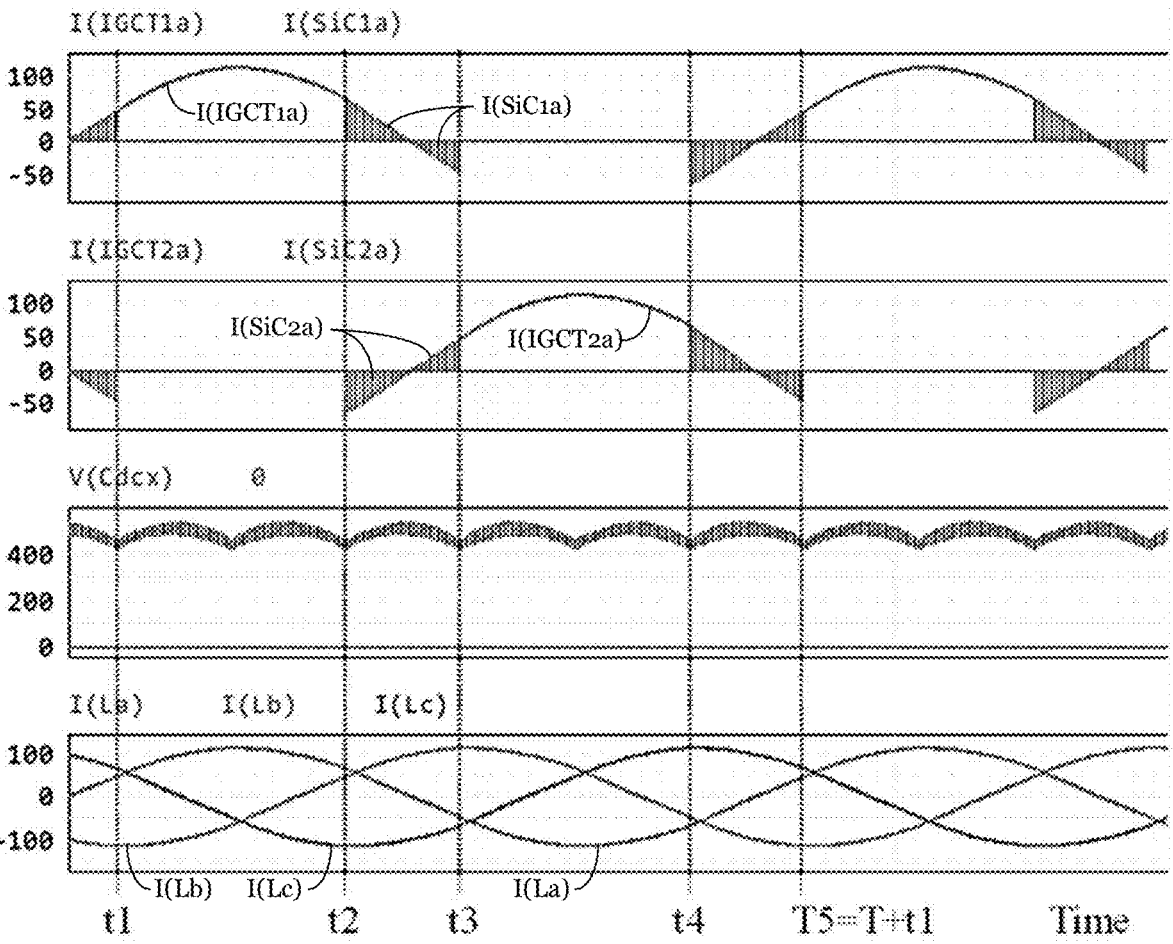
FIG. 6 illustrates examples of currents of the produced using the hybrid switches in a three-phase inverter, in accordance with various embodiments of the present disclosure.

FIG. 5A illustrates application of the hybrid switch in accordance with the disclosure in a three-phase inverter. FIG. 5B shows the three-phase inverter implemented with the hybrid switch of FIG. 1A. FIG. 6 shows an example of the load currents for the three phases (bottom) supplied by switching the silicon power devices S1-S6 at a lower switching frequency than the wide bandgap devices M1-M6. The currents of the wide bandgap devices and the currents of the silicon power devices produced by the switching scheme are also illustrated (top) with the DC bus voltage shown (middle). As can be seen in FIG. 6, the high-speed SiC devices M1-M6 only operate during 1/3 of grid cycle to significantly reduce the current stress and the associated conduction loss. The slow-speed silicon devices S1-S6 with very low voltage drop don't suffer high switching loss while achieving low conduction loss with low cost. This hybrid switching method can be applied to DC to AC and AC to DC conversion where the DC operates as a controlled power source and the AC is a three-phase voltage or current source.

For example, the coordinated operation of all 12 devices in DC to AC conversion generates sinusoidal, three phase, low harmonic distortion AC current from a dynamic DC input current or voltage.

Control of the parallel devices operating at different switching frequencies for three-phase inverters or converters is illustrated in FIG. 6. The control scheme can be explained using time markers t1 through t5 for the two hybrid switches of phase A over a grid cycle T, as shown in FIG. 6. At time t1, slow-speed silicon device S1 is switched ON while devices S2 and M1-M2 are switched OFF. As seen in FIG. 6, time t1 corresponds to the cross-over of the phase A and C currents and the peak negative current for phase B. The current phase can lag, lead or be aligned with the voltage phase to meet the needs of the application. At time t2, operation of high-speed silicon devices M1-M2 is initiated while devices S1-S2 are switched OFF. As seen in FIG. 6, time t2 corresponds to the cross-over of the phase A and B currents and the peak negative current for phase C. The current phase can lag, lead or be aligned with the voltage phase to meet the needs of the application. The high frequency operation continues until time t3, where slow-speed silicon device S2 is switched ON while devices S1 and M1-M2 are switched OFF. As seen in FIG. 6, time t3 corresponds to the cross-over of the phase A and C currents and the peak positive current for phase B. The current phase can lag, lead or be aligned with the voltage phase to meet the needs of the application. At time t4, operation of high-speed silicon devices M1-M2 is initiated while devices S1-S2 are switched OFF. As seen in FIG. 6, time t4 corresponds to the cross-over of the phase A and B currents and the peak positive current for phase C. The current phase can lag, lead or be aligned with the voltage phase to meet the needs of the application. The grid cycle T is then repeated. The table below indicates the device states between the time markers over the grid cycle T.

| Time Marker | % Grid Cycle | S1 (Si) | M1 (SiC) | S2 (Si) | M2 (SiC) |
|---|---|---|---|---|---|
| [t1, t2] | 2/6 | On | Off | Off | Off |
| [t2, t3] | 1/6 | Off | On/Off (High Freq.) | Off | Off/On (High Freq.) |
| [t3, t4] | 2/6 | Off | Off | On | Off |
| [t4, t5] | 1/6 | Off | On/Off (High Freq.) | Off | Off/On (High Freq.) |

Phases B and C follow similar sequences. The slow switching silicon devices S1-S6 can operate at grid frequency and conduct the output current during 2/3 of the grid cycle. The high frequency switching silicon carbide devices M1-M6 conduct the current during 1/3 of grid cycle. High frequency switching of the three-phases covers all (3/3) of the grid cycles and drastically reduces the size, weight, and cost of the inductor chokes on the AC or grid side as shown in the circuit in the example of FIG. 5B.

Figure 7A:
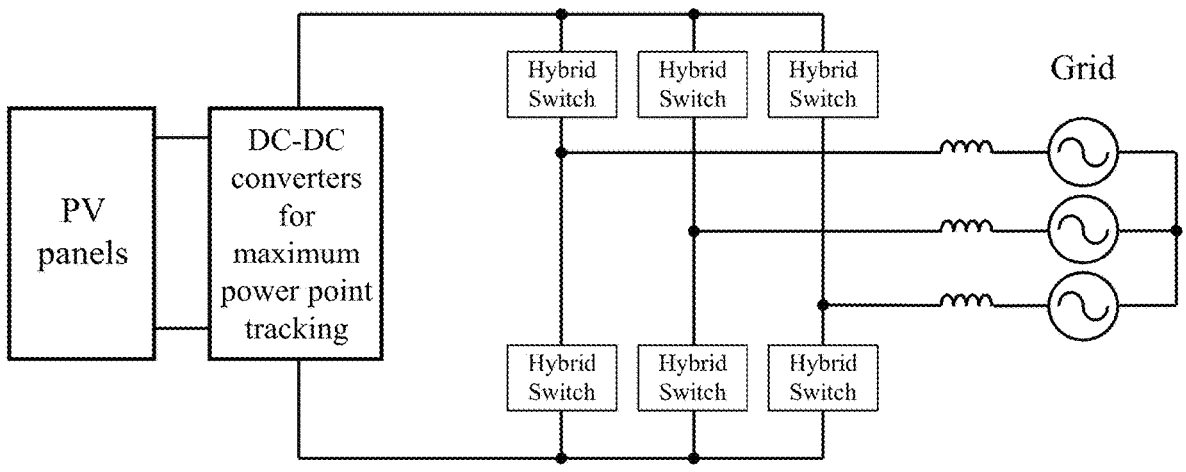
FIGS. 7A and 7B illustrate examples of three-phase inverter applications, in accordance with various embodiments of the present disclosure.
Figure 7B:
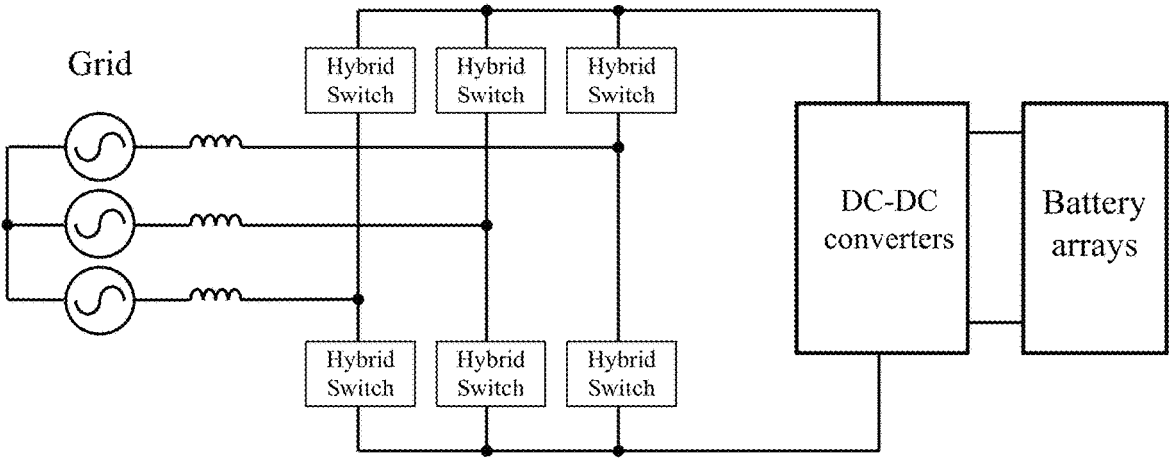

FIGS. 7A and 7B show examples of three-phase inventor applications for photovoltaics (PV) or electric vehicle/battery storage, respectively. Voltage and current phase sensors can provide feedback for gate control. The low switching frequency can be controlled based on the voltage feedback and the high switching frequency can be controlled based on the current feedback.

It is seen that the hybrid switch in accordance with the basic principles of the disclosure facilitates design and operation of soft switching or hard-switching power regulator and converters and power inverters while providing a significant improvement in light and/or heavy load efficiency in any such application. The hybrid switch can be embodied as discrete devices or a three (or four—for connecting an external delay or control) terminal switch package.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method of reducing conduction and switching losses in a high current switching circuit, comprising:

controlling two hybrid switches to conduct concurrently or alternately, the two hybrid switches connected in series, wherein each of said two hybrid switches comprise a wide bandgap device and a silicon power device connected in parallel, controlling of the silicon power device in a selective ON-OFF mode without pulse width modulation (PWM) at a first gate switching frequency and controlling of the wide bandgap device in a PWM mode at a second gate switching frequency, where the first gate switching frequency is lower than the second gate switching frequency, wherein the silicon power device is controlled at the first gate switching frequency while the wide bandgap device is in an off state and the wide bandgap device is controlled at the second gate switching frequency while the silicon power device is in an off state.

2. The method of claim 1, wherein the silicon power device is switched at the first gate switching frequency of about 50 or 60 Hertz.

3. The method of claim 1, wherein said two hybrid switches form a half-bridge circuit.

4. The method of claim 1, wherein two additional hybrid switches are controlled to conduct alternately in a full bridge circuit.

5. The method of claim 1, wherein said two hybrid switches form a phase leg of a multi-phase power converter.

6. The method of claim 1, wherein four additional hybrid switches are controlled to conduct in a three-phase circuit.

7. The method of claim 2, wherein the wide bandgap device is switched at the second switching frequency greater than 1 kHz.

8. The method of claim 2, wherein said two hybrid switches form a half-bridge circuit.

9. The method of claim 2, wherein two additional hybrid switches are controlled to conduct alternately in a full bridge circuit.

10. The method of claim 2, wherein said two hybrid switches form a phase leg of a multi-phase power converter.

11. The method of claim 2, wherein four additional hybrid switches are controlled to conduct in a three-phase circuit.

12. The method of claim 7, wherein the wide bandgap device is switched at the second switching frequency of about 20 kHz.

13. The method of claim 7, wherein said two hybrid switches form a half-bridge circuit.

14. The method of claim 7, wherein two additional hybrid switches are controlled to conduct alternately in a full bridge circuit.

15. The method of claim 7, wherein said two hybrid switches form a phase leg of a multi-phase power converter.

16. The method of claim 12, wherein said two hybrid switches form a half-bridge circuit.

17. The method of claim 12, wherein two additional hybrid switches are controlled to conduct alternately in a full bridge circuit.

18. The method of claim 12, wherein said two hybrid switches form a phase leg of a multi-phase power converter.

19. The method of claim 12, wherein four additional hybrid switches are controlled to conduct in a three-phase circuit.

\* \* \* \* \*